US008055426B2

(12) United States Patent
Nam et al.

(10) Patent No.: US 8,055,426 B2
(45) Date of Patent: Nov. 8, 2011

(54) TIRE DRIVING OPTIMIZATION SYSTEM AND CONTROL METHOD THEREOF

(75) Inventors: Juhyun Nam, Bucheon (KR); Heeyong Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 405 days.

(21) Appl. No.: 12/473,974

(22) Filed: May 28, 2009

(65) Prior Publication Data

US 2010/0138130 A1 Jun. 3, 2010

(30) Foreign Application Priority Data

Nov. 28, 2008 (KR) ........................ 10-2008-0120071

(51) Int. Cl.
*G06F 7/00* (2006.01)

(52) U.S. Cl. ........................................................ 701/86

(58) Field of Classification Search .................... 701/86, 701/103, 104; 180/284, 285
See application file for complete search history.

(56) References Cited

U.S. PATENT DOCUMENTS 5,097,809 A * 3/1992 Sekozawa et al. ....... 123/406.19
6,484,832 B1 * 11/2002 Morisawa et al. ....... 180/65.225
6,763,908 B2 * 7/2004 Ogawa et al. ................. 180/446
7,328,097 B2 * 2/2008 Sawada et al. .................. 701/70
7,400,104 B2 * 7/2008 Sato .............................. 318/376
2008/0196952 A1 * 8/2008 Soliman et al. .............. 180/65.2
2008/0275596 A1 * 11/2008 Tarasinski et al. ................ 701/1
2010/0038158 A1 * 2/2010 Whitney et al. .......... 180/65.265
2010/0071987 A1 * 3/2010 Hyodo et al. ................. 180/338
2010/0076637 A1 * 3/2010 Ueoka ............................. 701/22
2010/0324796 A1 * 12/2010 Takeuchi et al. ................ 701/70

FOREIGN PATENT DOCUMENTS

JP 2004282903 A * 10/2004
KR 1998-0001126 A 3/1998

* cited by examiner

*Primary Examiner* — Faye M. Fleming
(74) *Attorney, Agent, or Firm* — Morgan, Lewis & Bockius LLP

(57) ABSTRACT

The tire driving optimization system may include a first tire that is disposed at one side of a vehicle to transmit driving torque from an engine to a road surface, a second tire that is disposed at the other side of the vehicle to transmit driving torque from the engine to a road surface, an accelerator pedal that is operated by a driver so as to control a fuel injection amount that is injected into the engine, and a control portion configured to determine a first consumption energy value that is consumed through the first tire and a second consumption energy value that is consumed through the second tire, and to adjust engine output based on the first consumption energy value and the second consumption energy value if the vehicle is unstable.

15 Claims, 3 Drawing Sheets

TIRE DRIVING OPTIMIZATION SYSTEM AND CONTROL METHOD THEREOF

CROSS-REFERENCE TO RELATED APPLICATION

This application claims priority to Korean Patent Application Number 10-2008-0120071 on Nov. 28, 2008, the entire contents of which are incorporated herein for all purposes by reference.

BACKGROUND OF THE INVENTION

1. Field of the Invention

The present invention relates to a tire driving optimization system and control method, and more particularly to a tire driving optimization system for adjusting an engine output to optimize driving of a vehicle.

2. Description of Related Art

Generally, a tire for a vehicle is mounted on a wheel that is fixed to an axle, absorbs impacts that are transmitted from a road surface, and has a structure to minimize slip amount with the road surface.

However, when the road state is poor, that is, when it rains or snows, the friction coefficient of the tire and the road is lowered, and therefore the drive tire slips on the road.

Particularly, when the driver manipulates a steering wheel, an under-steer or over-steer phenomenon can be generated, and so a high degree of skill is demanded for driving.

Accordingly, snow-tires or chains are used so as to prevent the slip between the tire and the road, and particularly to prevent a slide on a snow-covered road in winter.

However, the snow tire or the chain needs to be present in the vehicle and it is also troublesome to use.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a tire driving optimization system having advantages of minimizing a slip amount between a tire and road surface.

In an aspect of the present invention, the tire driving optimization system may include a first tire that is disposed at one side of a vehicle to transmit driving torque from an engine to a road surface; a second tire that is disposed at the other side of the vehicle to transmit driving torque from the engine to a road surface; an accelerator pedal that is operated by a driver so as to control a fuel injection amount that is injected into the engine; and a control portion configured to determine a first consumption energy value that is consumed through the first tire and a second consumption energy value that is consumed through the second tire, and to adjust engine output based on the first consumption energy value and the second consumption energy value if the vehicle is unstable, wherein the control portion is configured to determine the vehicle is unstable if a difference between the first consumption energy value and the second consumption energy value exceeds a predetermined range or a ratio therebetween exceeds a predetermined range.

The control portion may decrease the fuel amount that is injected into the engine to lower than a predetermined normal value to reduce the engine output while the vehicle is unstable.

The control portion may be configured to determine the vehicle is unstable if at least one of a difference value between the first consumption energy value and a predetermined standard consumption energy value and a difference value between the second consumption energy value and a predetermined standard consumption energy value, is in excess of a predetermined value, wherein the predetermined standard consumption energy values are preset based on a vehicle speed, and/or a standard torque.

The control portion may be configured to determine the vehicle is unstable if at least one of a ratio between the first consumption energy value and a predetermined standard consumption energy value and a ratio between the second consumption energy value and a predetermined standard consumption energy value, is in excess of a predetermined value, wherein the predetermined standard consumption energy values are preset based on a vehicle speed, and/or a standard torque.

The control portion may detect torque and rotation speed from a torque sensor and an RPM sensor so as to determine the first consumption energy value and the second consumption energy value that are consumed by the first and second tires.

The control portion may forcibly decrease the size of a signal that is outputted from the accelerator pedal by as much as a predetermined ratio to decrease the fuel amount that is injected into the engine if the vehicle is unstable for a predetermined time period.

The control portion may detect an operational signal of an electronic stability program (ESP) or a vehicle dynamic control (VDC), and when the ESP or the VDC is not operating, decreases the engine output.

The control portion may detect an operational signal of an anti-lock braking system (ABS), and when the ABS is not operating, decreases the engine output, wherein the control portion decreases the engine output when the pressed amount of the accelerator pedal is higher than about 20% of a maximum thereof and wherein the control portion detects the vehicle speed from a GPS signal, and lowers the engine output when the vehicle speed is lower than a predetermined value.

In another aspect of the present invention, the tire driving optimization system may include a first tire that is disposed at one side of a vehicle to transmit driving torque from an engine to a road surface; a second tire that is disposed at the other side of the vehicle to transmit the driving torque from the engine to a road surface; a control portion that determines a first consumption energy value that is consumed through the first tire and a second consumption energy value that is consumed through the second tire, compares the first consumption energy value and the second consumption energy value, and if the difference thereof exceeds a predetermined range or a ratio therebetween exceeds a predetermined range, decreases torque that is generated from the engine in a range where a tire slips on the road.

In further another aspect of the present invention, the tire driving optimization method, including a first tire that is disposed at one side of a vehicle to transmit driving torque from an engine to a road surface and a second tire that is disposed at the other side of the vehicle to transmit the driving torque from the engine to a road surface, may include calculating a first consumption energy value that is transmitted through the first tire; calculating a second consumption energy value that is transmitted through the second tire; comparing the first consumption energy value with the second consumption energy value to determine a difference value thereof or a ratio thereof; and decreasing a fuel amount that is injected into the engine when the difference value is in excess of a predetermined range or when the ratio therebetween is in excess of a predetermined range.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
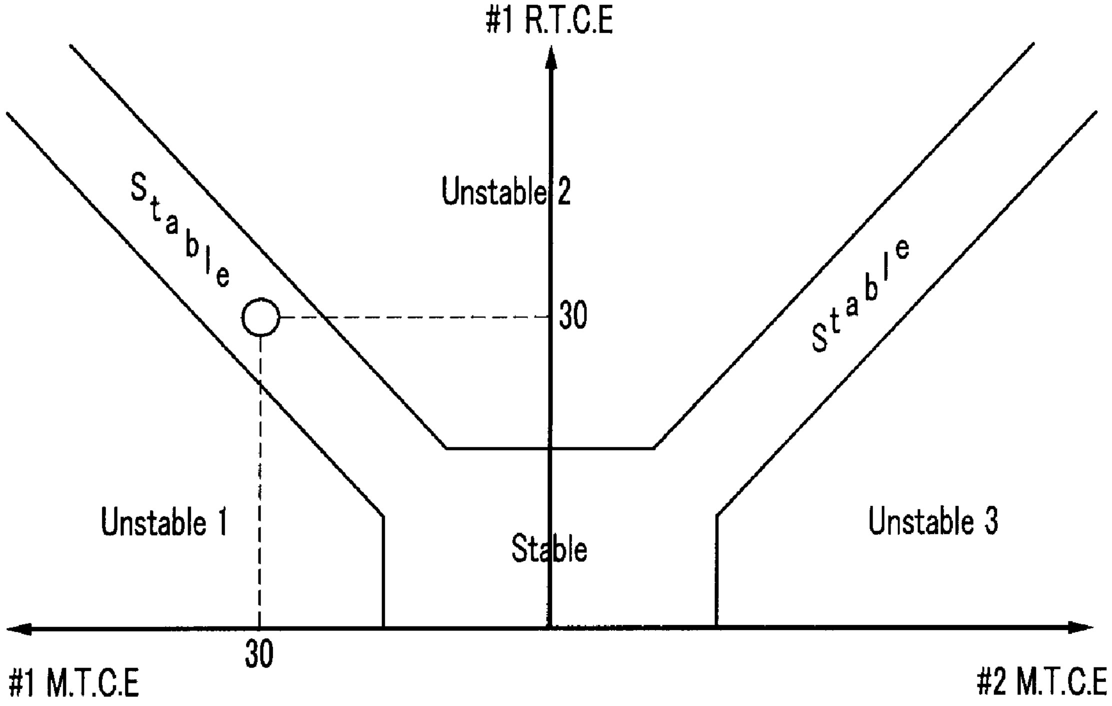
FIG. 1 is a graph showing a stable range and an unstable range of a tire driving optimization system according to an exemplary embodiment of the present invention.

FIG. 1 is a graph showing a stable range and an unstable range of a tire driving optimization system according to various embodiments of the present invention.

At least a first monitor tire and a second monitor tire that respectively transmit engine power to the road are installed to a vehicle, and a control portion detects energy amounts that are transferred to the first and second monitor tires.

Referring to FIG. 1, the first monitor tire consumption energy value (#1 M.T.C.E) shows energy amount that is transmitted through the first monitor tire to be monitored, and M.T.C.E is an abbreviated form of "monitor tire consumption energy."

Further, the second monitor tire consumption energy value (#2 M.T.C.E) indicates the energy that is consumed through the second monitor tire to be monitored and the first standard tire consumption energy value (#1 R.T.C.E) indicates the energy that is consumed through the first standard tire (e.g. a predetermined reference value), and R.T.C.E is an abbreviated form of "reference tire consumption energy."

The tire consumption energy is the energy that is generated from the engine and is transmitted to the road through the tire, and the control portion uses torque, rotation speed, and kinetic mass to calculate the tire consumption energy.

Here, the torque is calculated through a torque sensor that senses a torque that is transmitted to the respective tires, and likewise, the rotation speed is detected by an RPM sensor and the kinetic mass is a predetermined value in a design specification.

The control portion calculates or selects a first standard tire consumption energy value (#1 R.T.C.E) that is consumed by a first standard tire in predetermined map data, and the first standard tire consumption energy value (#1 R.T.C.E) is set or calculated by the vehicle speed, the engine output, the standard torque, and so on.

Further, the control portion calculates the first monitor tire consumption energy value (#1 M.T.C.E) that is consumed through the first monitor tire from the torque sensor and the RPM gauge, and the second monitor tire consumption energy value (#2 M.T.C.E) that is consumed by the second monitor tire is calculated in a like manner.

Referring to FIG. 1, if the first standard tire consumption energy value (#1 R.T.C.E) is 30 and the first monitor tire consumption energy value (#1 M.T.C.E) is 30, the vehicle is in a stable driving state.

However, if the difference value between the first standard tire consumption energy value (#1 R.T.C.E) and the first monitor tire consumption energy value (#1 M.T.C.E) is in excess of a predetermined range or a ratio therebetween exceeds a predetermined range, the vehicle is in an unstable driving state.

Similarly, in various embodiments of the present invention, if the first standard tire consumption energy value (#1 R.T.C.E) is 30 and the second monitor tire consumption energy value (#2 M.T.C.E) is 30, i.e., a ratio therebetween is substantially equal to 1, the vehicle is in a stable driving state.

However, if the difference value between the first standard tire consumption energy value (#1 R.T.C.E) and the second monitor tire consumption energy value (#2 M.T.C.E) is in excess of the predetermined range or the ratio therebetween exceeds a predetermined range, the vehicle is in an unstable driving state.

The control portion repeatedly detects the energy that is substantially consumed by a tire of the vehicle, compares it with the energy that is consumed in a predetermined standard tire, and thereby determines whether the running state is in a stable range or in an unstable range.

In various embodiments of the present invention, the stable region can be considered to be a condition in which the tire substantially does not slide on the road surface, and the unstable region can be considered to the condition in which the tire substantially slides on the road surface.

That is, when the slip is excessively generated, the rotation speed of the tire can be increased, but the torque and energy that is transmitted through the tire can be sharply decreased.

Accordingly, the consumed energies (#1 M.T.C.E or #2 M.T.C.E) between the slip tire and the non-slip tire are very different.

Referring to FIG. 1, in various embodiments of the present invention, if the first standard tire consumption energy value (#1 R.T.C.E) is lower than a predetermined value and the first monitor tire consumption energy value (#1 M.T.C.E) is lower than a predetermined value, the slip does not occur between the tire and the road such that the vehicle is considered to be in a stable condition.

Figure 2:
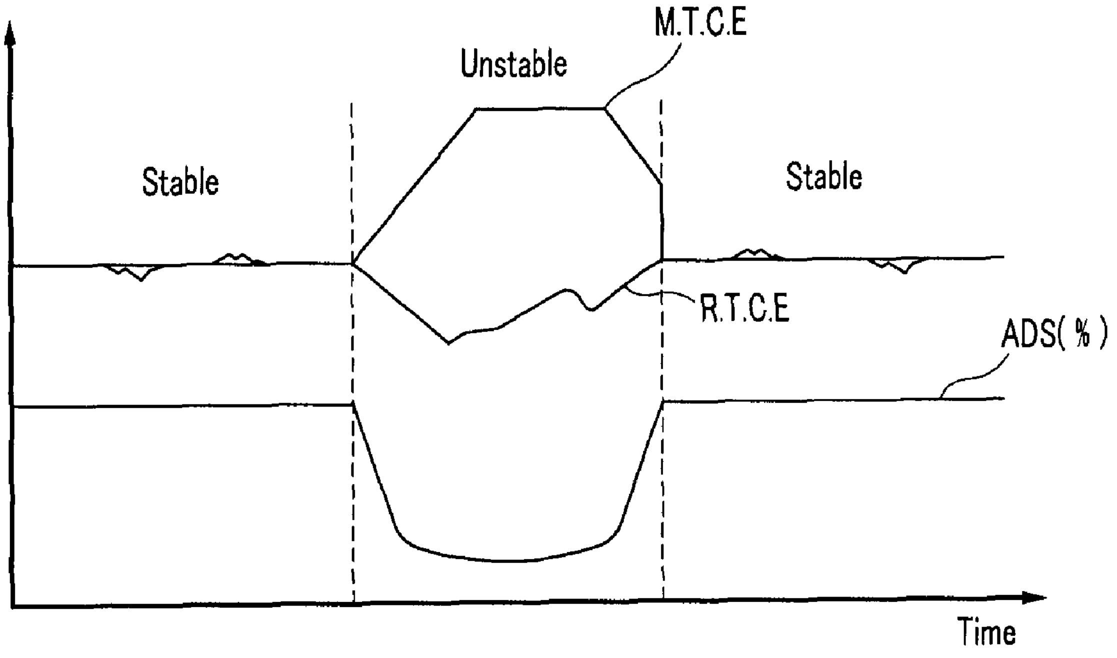
FIG. 2 is a graph showing a stable range and an unstable range of a tire driving optimization system according to an exemplary embodiment of the present invention.

FIG. 2 is a graph showing a stable range and an unstable range of a tire driving optimization system according to various embodiments of the present invention.

Referring to FIG. 2, the horizontal axis indicates a time and the vertical axis indicates a ratio ("ADS") of R.T.C.E v. M.T.C.E.

A stable state is formed at an early stage and then an unstable state and a stable state are sequentially generated on the basis of time.

The stable state and the unstable state are varied in accordance with the difference value between the first standard tire consumption energy value (#1 R.T.C.E) and the first monitor tire consumption energy value (#1 M.T.C.E).

That is, if the difference value is within a predetermined range or a ratio therebetween is within a predetermined range, the vehicle is in the stable state, and if the difference value is outside a predetermined range or a ratio therebetween is outside a predetermined range, the vehicle is in the unstable state.

During the unstable state, the signal size that is generated by an accelerator position sensor is forcibly decreased as much a predetermined ratio and so the fuel amount that is supplied into the cylinder is reduced such that the engine output is lowered.

Accordingly, the energy that is transmitted to the tire is lowered such that the slip between the road and the tire is reduced or eliminated.

Figure 3:
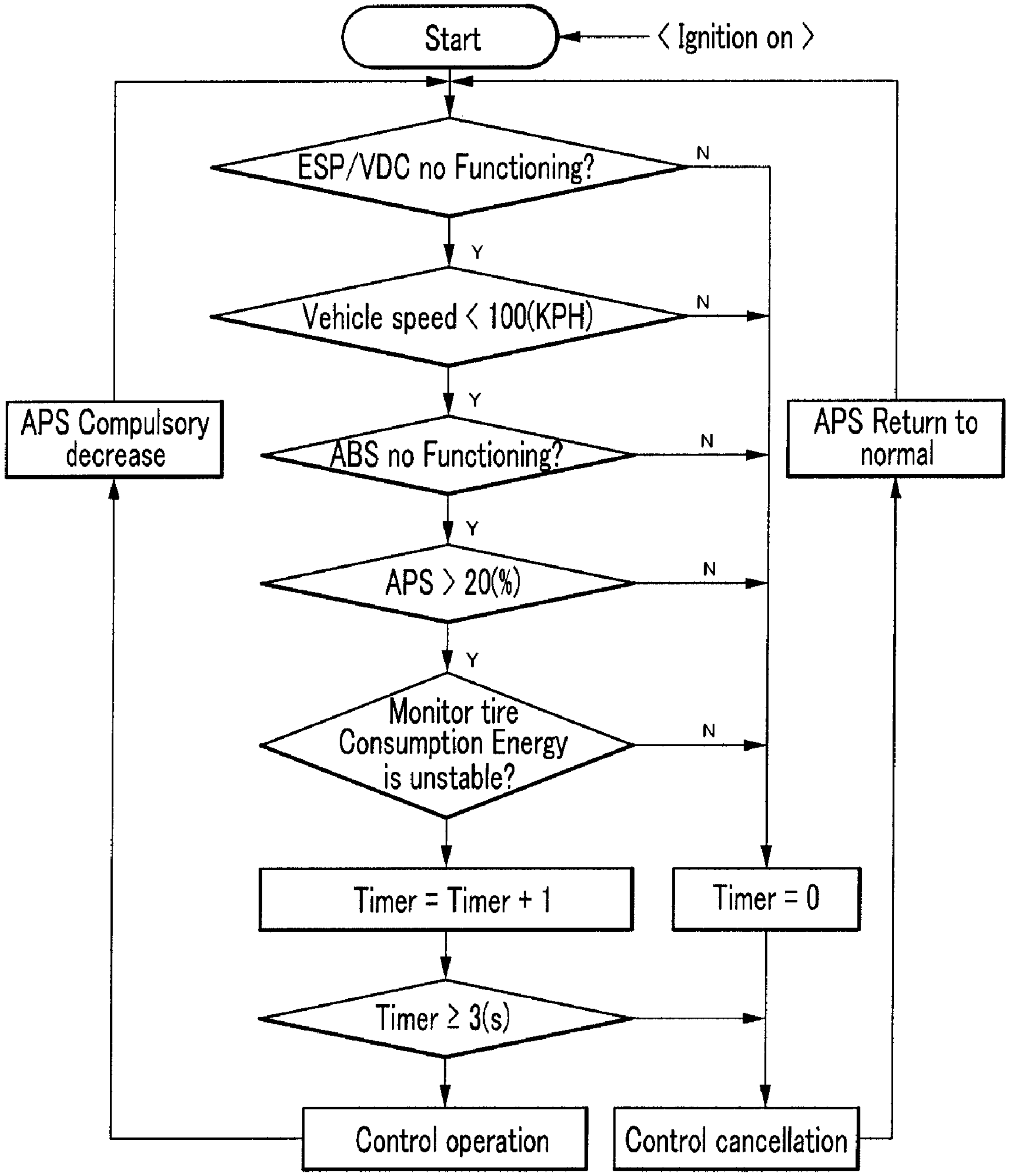
FIG. 3 is a control flowchart of a tire driving optimization system according to an exemplary embodiment of the present invention.

FIG. 3 is a control flowchart of a tire driving optimization system according to various embodiments of the present invention.

Referring to FIG. 3, the engine is ignited and a control flow starts and the operational signal of an electronic stability program (ESP) or vehicle dynamic control (VDC) is detected. Here, if the operational signal is not detected, it is determined whether the vehicle speed is lower than a predetermined speed (100 km/h).

Then, it is determined whether an anti-lock braking system (ABS) is operated or not and whether the pressed amount of the accelerator pedal that is detected by an APS (accelerator pedal sensor) is lower than a predetermined value (20%).

If the ABS is not operated and the pressed amount of the accelerator pedal is higher than the predetermined value, it is determined whether the energy that is consumed through the tire is in excess of the predetermined range and whether the vehicle is in an unstable state.

If the unstable state is continued for longer than 3 sec, the output signal size of the accelerator position sensor is forcibly decreased as much a predetermined amount such that the fuel injection amount is reduced and the engine output is lowered, and therefore the slip between the road and the tire is reduced or eliminated.

In various embodiments of the present invention, if the ESP or VDC operate, the vehicle speed is in excess of a predetermined value (100 km/hr), the ABS operates, or the pressed amount of the accelerator pedal is lower than 20%, the tire hardly slips on the road, and therefore it is not needed to lower the engine output.

In various embodiments of the present invention, the first standard tire consumption energy value (#1 R.T.C.E) can be calculated based on predetermined map data or a vehicle speed that is transmitted from a GPS.

Further, in various embodiments of the present invention, the first monitor tire consumption energy value (#1 M.T.C.E) and the second monitor tire consumption energy value (#1 M.T.C.E) are compared with each other and thereby it can be determined whether the vehicle is in a stable running state or not.

The first monitor tire consumption energy value designates a first consumption energy value, the second monitor tire consumption energy value designates a second consumption energy value, and the first standard tire consumption energy designates a standard consumption energy value.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A tire driving optimization system, comprising:

a first tire that is disposed at one side of a vehicle to transmit driving torque from an engine to a road surface;

a second tire that is disposed at the other side of the vehicle to transmit driving torque from the engine to a road surface;

an accelerator pedal that is operated by a driver so as to control a fuel injection amount that is injected into the engine; and a control portion configured to determine a first consumption energy value that is consumed through the first tire and a second consumption energy value that is consumed through the second tire, and to adjust engine output based on the first consumption energy value and the second consumption energy value if the vehicle is unstable.

2. The tire driving optimization system of claim 1, wherein the control portion is configured to determine the vehicle is unstable if a difference between the first consumption energy value and the second consumption energy value exceeds a predetermined range or a ratio therebetween exceeds a predetermined range.

3. The tire driving optimization system of claim 1, wherein the control portion decreases the fuel amount that is injected into the engine to lower than a predetermined normal value to reduce the engine output while the vehicle is unstable.

4. The tire driving optimization system of claim 1, wherein the control portion is configured to determine the vehicle is unstable if at least one of a difference value between the first consumption energy value and a predetermined standard consumption energy value and a difference value between the second consumption energy value and a predetermined standard consumption energy value, is in excess of a predetermined value.

5. The tire driving optimization system of claim 4, wherein the predetermined standard consumption energy values are preset based on a vehicle speed, and/or a standard torque.

6. The tire driving optimization system of claim 1, wherein the control portion is configured to determine the vehicle is unstable if at least one of a ratio between the first consumption energy value and a predetermined standard consumption energy value and a ratio between the second consumption energy value and a predetermined standard consumption energy value, is in excess of a predetermined value.

7. The tire driving optimization system of claim 6, wherein the predetermined standard consumption energy values are preset based on a vehicle speed, and/or a standard torque.

8. The tire driving optimization system of claim 1, wherein the control portion detects torque and rotation speed from a torque sensor and an RPM sensor so as to determine the first consumption energy value and the second consumption energy value that are consumed by the first and second tires.

9. The tire driving optimization system of claim 1, wherein the control portion forcibly decreases the size of a signal that is outputted from the accelerator pedal by as much as a predetermined ratio to decrease the fuel amount that is injected into the engine if the vehicle is unstable for a predetermined time period.

10. The tire driving optimization system of claim 1, wherein the control portion detects an operational signal of an electronic stability program (ESP) or a vehicle dynamic control (VDC), and when the ESP or the VDC is not operating, decreases the engine output.

11. The tire driving optimization system of claim 1, wherein the control portion detects an operational signal of an anti-lock braking system (ABS), and when the ABS is not operating, decreases the engine output.

12. The tire driving optimization system of claim 9, wherein the control portion decreases the engine output when the pressed amount of the accelerator pedal is higher than about 20% of a maximum thereof.

13. The tire driving optimization system of claim 9, wherein the control portion detects the vehicle speed from a GPS signal, and lowers the engine output when the vehicle speed is lower than a predetermined value.

14. A tire driving optimization system, comprising:

a first tire that is disposed at one side of a vehicle to transmit driving torque from an engine to a road surface;

a second tire that is disposed at the other side of the vehicle to transmit the driving torque from the engine to a road surface;

a control portion that determines a first consumption energy value that is consumed through the first tire and a second consumption energy value that is consumed through the second tire, compares the first consumption energy value and the second consumption energy value, and if the difference thereof exceeds a predetermined range or a ratio therebetween exceeds a predetermined range, decreases torque that is generated from the engine in a range where a tire slips on the road.

15. A tire driving optimization method, including a first tire that is disposed at one side of a vehicle to transmit driving torque from an engine to a road surface and a second tire that is disposed at the other side of the vehicle to transmit the driving torque from the engine to a road surface, comprising:

calculating a first consumption energy value that is transmitted through the first tire;

calculating a second consumption energy value that is transmitted through the second tire;

comparing the first consumption energy value with the second consumption energy value to determine a difference value thereof or a ratio thereof; and decreasing a fuel amount that is injected into the engine when the difference value is in excess of a predetermined range or when the ratio therebetween is in excess of a predetermined range.

* * * * *